United States Patent
Shekh-Yusef et al.

(10) Patent No.: US 10,084,797 B2
(45) Date of Patent: Sep. 25, 2018

(54) ENHANCED ACCESS SECURITY GATEWAY

(71) Applicant: Extreme Networks, Inc., San Jose, CA (US)

(72) Inventors: Rifaat Shekh-Yusef, Belleville (CA); William T. Walker, Evergreen, CO (US)

(73) Assignee: Extreme Networks, Inc., San Jose, CA (US)

( * ) Notice: Subject to any disclaimer, the term of this patent is extended or adjusted under 35 U.S.C. 154(b) by 169 days.

(21) Appl. No.: 15/284,131

(22) Filed: Oct. 3, 2016

(65) Prior Publication Data

US 2018/0097818 A1    Apr. 5, 2018

(51) Int. Cl.
*H04L 29/06* (2006.01)
*H04L 9/32* (2006.01)

(52) U.S. Cl.
CPC ............ *H04L 63/108* (2013.01); *H04L 63/08* (2013.01); *G06F 2221/2103* (2013.01); *H04L 9/3265* (2013.01)

(58) Field of Classification Search
None
See application file for complete search history.

(56) References Cited

U.S. PATENT DOCUMENTS

| | | | | |
|---|---|---|---|---|
| 5,491,752 A | * | 2/1996 | Kaufman | G06F 21/335 380/30 |
| 5,872,917 A | * | 2/1999 | Hellman | G06F 21/31 709/229 |
| 6,487,667 B1 | * | 11/2002 | Brown | G06F 21/31 709/229 |
| 7,603,556 B2 | * | 10/2009 | Brown | H04L 9/3271 713/169 |
| 8,312,264 B2 | | 11/2012 | Kelly et al. | |
| 8,819,426 B2 | | 8/2014 | Devanand et al. | |
| 2002/0034939 A1 | * | 3/2002 | Wenzel | H04L 63/08 455/411 |
| 2003/0041244 A1 | * | 2/2003 | Buttyan | G06Q 20/20 713/172 |
| 2003/0212892 A1 | * | 11/2003 | Oishi | H04L 29/12009 713/168 |
| 2004/0073797 A1 | * | 4/2004 | Fascenda | H04L 9/3234 713/171 |

(Continued)

FOREIGN PATENT DOCUMENTS

WO    WO 2006073250    7/2006

*Primary Examiner* — Peter Poltorak
(74) *Attorney, Agent, or Firm* — Haley Guiliano LLP (57) ABSTRACT

A first login request of a user is received from a first login window. The first login request comprises a login name, a user identifier, and a challenge. The challenge is generated and received from a second login request to a product in a second login window. The user copies and pastes the challenge into the first login window. A central control system determines if the login name and the user identifier are valid. If the login name and user identifier are valid, a response to the challenge is generated based a private key and is displayed in the first login window. The response to the challenge is copied from the first login window and pasted as part of a second step the second login process. The second login process verifies the response to the challenge using a public key to allow the user access to the product.

18 Claims, 5 Drawing Sheets

(56) References Cited

U.S. PATENT DOCUMENTS

| | | | | |
|---|---|---|---|---|
| 2005/0210282 A1* | 9/2005 | Ohmori | H04L 63/1466 | 726/22 |
| 2005/0257056 A1* | 11/2005 | Morita | G06F 21/10 | 713/170 |
| 2006/0085351 A1* | 4/2006 | Hug | G06F 21/10 | 705/59 |
| 2007/0011136 A1* | 1/2007 | Haskin | G06F 21/41 | |
| 2007/0186103 A1* | 8/2007 | Randle | G06F 21/31 | 713/168 |
| 2010/0088519 A1* | 4/2010 | Tsuruoka | G06F 21/33 | 713/176 |
| 2013/0326597 A1* | 12/2013 | Matsushita | H04N 21/25875 | 726/5 |
| 2014/0052617 A1* | 2/2014 | Chawla | G06Q 20/12 | 705/39 |
| 2014/0181529 A1* | 6/2014 | Joyce, III | H04L 63/083 | 713/183 |
| 2014/0189791 A1* | 7/2014 | Lindemann | H04L 63/105 | 726/3 |
| 2014/0208394 A1* | 7/2014 | Goodwin | H04L 63/102 | 726/4 |
| 2014/0359701 A1* | 12/2014 | Kikuchi | H04L 63/08 | 726/3 |
| 2014/0365771 A1* | 12/2014 | Sakumoto | G06F 21/31 | 713/168 |
| 2015/0215299 A1* | 7/2015 | Burch | H04L 63/08 | 726/5 |
| 2015/0254677 A1* | 9/2015 | Huxham | G06K 19/0709 | 705/57 |
| 2015/0318998 A1* | 11/2015 | Erlikhman | H04L 9/32 | 713/171 |
| 2015/0379623 A1* | 12/2015 | Gadre | G06Q 30/0643 | 705/27.2 |
| 2016/0105290 A1* | 4/2016 | Khalil | H04L 9/3271 | 713/176 |
| 2016/0314462 A1* | 10/2016 | Hong | G09C 5/00 | |
| 2017/0046560 A1* | 2/2017 | Tsur | G06F 21/32 | |

\* cited by examiner

ENHANCED ACCESS SECURITY GATEWAY

BACKGROUND

Current systems use encryption keys that are a shared secret between a product and a server. An encryption key is hardcoded into a product, such as a telephone. If an encryption key in the telephone is compromised, a large number of telephones may be compromised. To correct this problem, a new firmware version may be required to change the compromised encryption key in each telephone. The encryption key has to be uploaded to the product with an authentication file that is delivered by email or directly download. The authentication file uses encryption to hide the encryption key. In some cases, the encryption key is for a specific product release. If the encryption key is compromised, the whole product release may be compromised.

SUMMARY

These and other needs are addressed by the various embodiments and configurations of the present disclosure. A first login request of a user is received from a first login window. The first login request comprises a login name, a user identifier, and a challenge. The challenge is generated and received from a second login request to a product in a second login window. The user copies and pastes the challenge into the first login window. A central control system determines if the login name and the user identifier are valid. If the login name and user identifier are valid, a response to the challenge is generated based a private key and is displayed in the first login window. The response to the challenge is copied from the first login window and pasted as part of a second step the second login process in the second login window. The second login process verifies the response to the challenge using a public key to allow the user access to the product.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
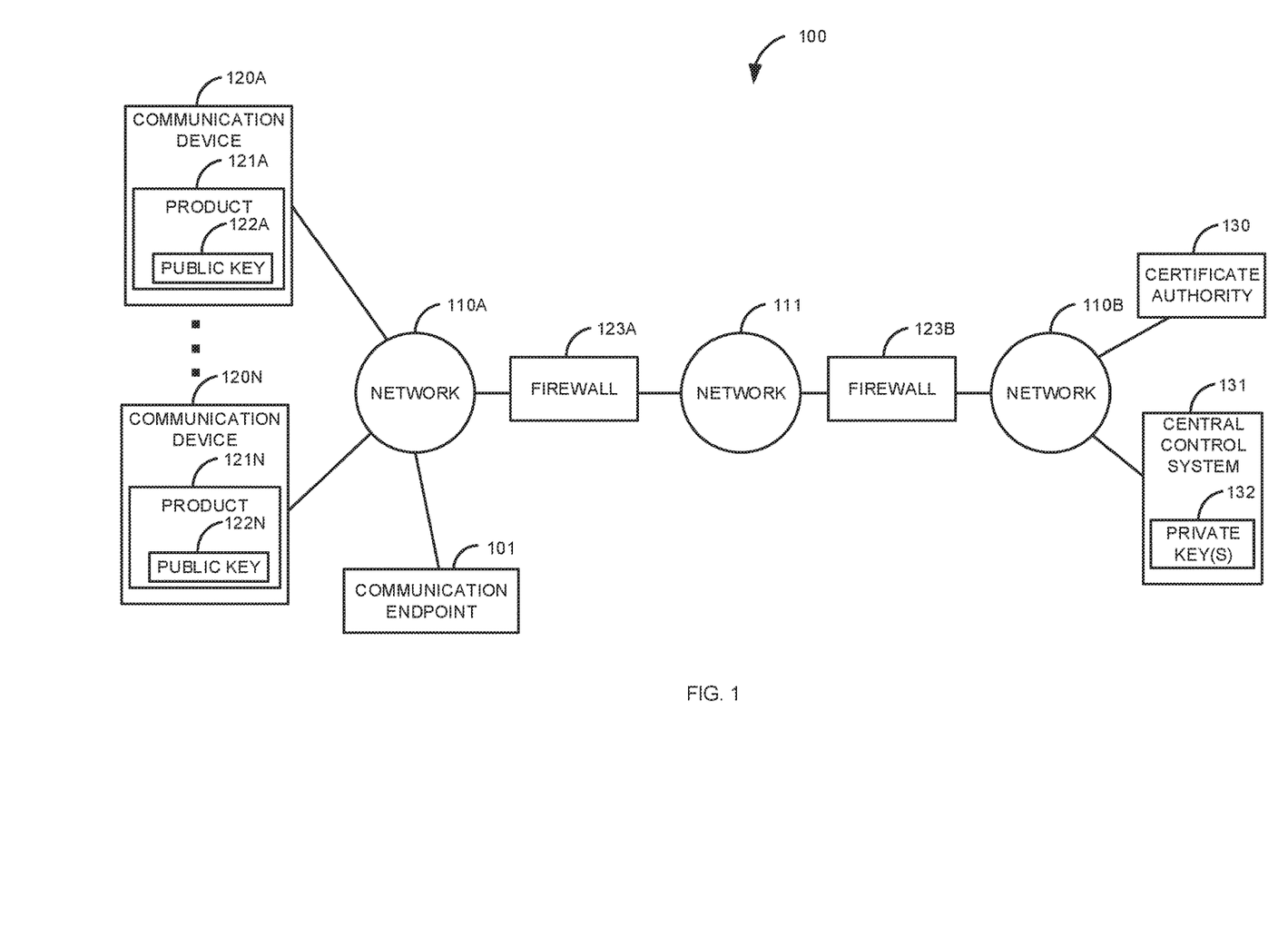
FIG. 1 is a block diagram of a first illustrative system for managing a secure login to a product.

FIG. 1 is a block diagram of a first illustrative system 100 for managing a secure login to a product 121. The first illustrative system 100 comprises a communication endpoint 101, networks 110A-110B, network 111, communication devices 120A-120N, firewalls 123A-123B, certificate authority 130, and central control system 131.

The communication endpoint 101 can be or may include any communication endpoint device that can communicate on the network 110, such as a Personal Computer (PC), a telephone, a cellular telephone, a Personal Digital Assistant (PDA), a tablet device, a notebook device, a smart phone, and/or the like. The communication endpoint 101 is a device where a communication session ends. The communication endpoint 101 is not a network element that facilitates and/or relays a communication session in the network 110/111, such as a communication manager or router. Although FIG. 1 only shows a single communication endpoint 101, the network 110 may have any number of connected communication endpoints 101.

The networks 110A-110B and 111 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The networks 110A-110B and 111 can use a variety of electronic protocols, such as Ethernet, Internet Protocol (IP), Session Initiation Protocol (SIP), Integrated Services Digital Network (ISDN), and the like. Thus, the networks 110A-110B and 111 are electronic communication networks configured to carry messages via packets and/or circuit switched communications. In FIG. 1, the network 110A is typically an enterprise network (e.g., a customer's network), the network 111 is typically a public network (e.g., the Public Switched Telephone Network (PSTN) or the Internet), and the network 110B is an enterprise network (e.g., a corporate network of a company that developed one or more of the products 121A-121N).

The communication devices 120A-120N can be any communication device 120 that comprises one or more applications 121. The communication devices 120A-120N can be or may include a Private Branch Exchange, a telephone, a scanner, a printer, a FAX machine, a communication endpoint 101, a web server, a file server, a proxy server, a session manager, a communication manager, a router, a switch, a mobile communication device, a firewall 123, a conference server, a media gateway, a session border controller, and/or the like.

The communication devices 120A-120N further comprise products 121A-121N. The products 121A-121N can be or may include hardware applications, software applications, or a combination of hardware/software applications. In FIG. 1, each communication device 120 comprises a respective product 121. However, a communication device 120 may comprise multiple products 121. For example, the communication device 120A may be a telephone that comprises a hardware product 121A (the telephone) and a software product 121B (not shown, e.g., a software application that is downloaded on the telephone). The products 121A-121N can be or may include one or more telephone applications, PBX applications, communication applications, web applications, social media applications, collaboration applications, email applications, Instant Messaging (IM) applications, text messaging applications, presence applications, Global Positioning Satellite (GPS) applications, Back-to-Back User Agents (B2BUAs), Session Initiation Protocol (SIP) applications, switching applications, printing applications, routing applications, scanning applications, FAX applications, video applications, gaming applications, virtual reality applications, contact center applications, and/or the like.

The products 121A-121N are shown as being in the communication devices 120A-120N. However, a product 121 may be distributed between multiple communication devices 120. The product 121 may be distributed between one or more communication devices 120 and the communication endpoint 101.

Each product 121A-121B further comprises a public key 122A-122N. The public key 122 is associated with a corresponding private key 132 stored on the central control system 131. In one embodiment, the public key 122 is used according to public-key cryptography standard known as PKI.

The firewalls 123A-123B can be any device coupled with software that can provide network security, such as a session border controller, a Network Address Translator, a virus scanner, and/or the like. The firewall 123A provides security for the network 110A from the network 111. The firewall 123B provides security for the network 110B from the network 111.

The certificate authority 130 is a certificate authority 130 that generates certificates (e.g., private and public key pairs). The certificate authority 130 may be a public or private certificate authority 130. The certificate authority 130 can generate certificates for a specific product 121, a specific product release, a specific type of hardware (e.g., for telephones from a specific manufacturer), a specific type of software (e.g., video conferencing software), a specific hardware release, a specific software release, and/or the like. The certificate authority 130 may comprise a hierarchy of certificate authorities 130.

The central control system 131 can be or may include any hardware coupled with software that can manage access to the products 121A-121N. The central control system 131 further comprises private key(s) 132. For example, the central control system 131 can have a first private key 132 associated with the public key 122A in product 121A and a second private key 132 associated with the public key 122N in product 121N.

Figure 2:
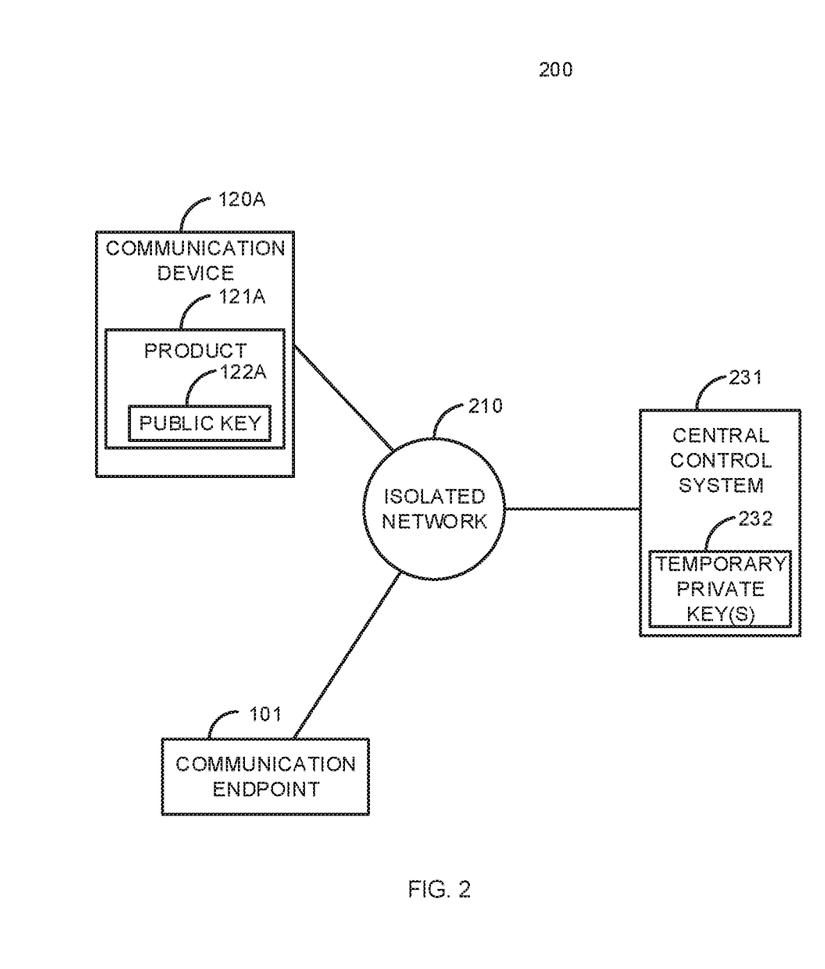
FIG. 2 is a block diagram of a second illustrative system for managing a secure login to a product on an isolated network.

FIG. 2 is a block diagram of a second illustrative system 200 for managing a secure login to a product 121 on an isolated network 210. The second illustrative system 200 comprises the communication endpoint 101, an isolated network 210, the communication device 120A, and a central control system 231.

The isolated network 210 is an isolated network 210 that is isolated from other networks 110. The isolated network 210 can be any type of communication network (e.g., like those described for the network 110) except that the isolated network 210 does not connect to another network 110. For example, the isolated network 210 may be a secure network at government or research location. The isolated network 210 may be a computer network on a submarine that is not connected to another network 110.

The communication device 120A comprises the product 121A. The product 121A comprises a public key 122A that is associated with a temporary private key 232.

The central control system 231 works similar to the central control system 131 of FIG. 1. In addition, the central control system 231 may use temporary private keys 232. A temporary private key 232 is a private key 132 that has an associated time period. When the time period has expired, the temporary key is disabled or removed from the central control system 231 so that access to the product 121A cannot occur (i.e., as discussed in FIG. 5). The temporary private key(s) 232 are installed on the central control system 231 by an administrator so that a user may temporarily login to the product 121A. For example, if the system of FIG. 2 is on a submarine, an administrator may install the temporary private key 232 to allow temporary access by a service technician. After the service technician leaves, the temporary private key 232 expires.

Figure 3:
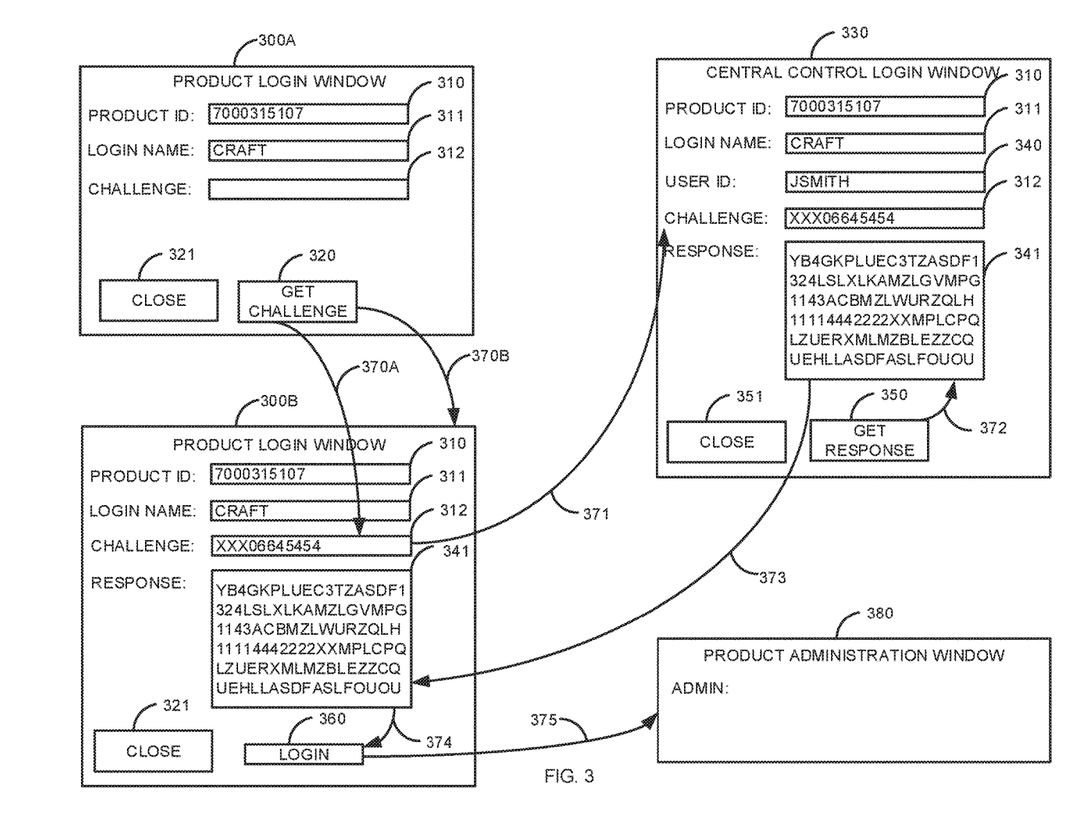
FIG. 3 is a diagram of a set of windows presented to a user for managing a secure login to a product.

FIG. 3 is a diagram of a set of windows presented to a user for managing a secure login to a product 121. FIG. 3. comprises product login windows 300A-300B, a central control login window 330, and a product administration window 380. The windows 300A-300B, 330, and 380 are typically displayed to a user via the communication endpoint 101. However, in other embodiments, the product login windows 300A-300B, the central control window 330, and the product administration may be displayed to the user on a communication device 120.

The product login window 300A comprises a product identifier 310, a login name 311, a challenge 312, a get challenge button 320, and a close button 321. In one embodiment, the product login window may not include the challenge 312. Alternatively, the product login window 300A may comprise the challenge 312 (which is empty) and a response to challenge 341 (which is also empty).

The product identifier 310 is a field where a user can enter a specific identifier to identify a product 121. A product identifier 310 may be a number, a name, a text string, and/or the like. The product identifier 310 may be a drop-down menu where the user selects the product 121 from a list of products.

The login name 311 is a field where the user enters a login name 311. In this example, the login name 311 entered by the user is "CRAFT" to signify that a craft (e.g., a technician) wants to login to access the product 121. There may be more than one user that uses the same login name 311. For example, different field technicians may all use the same login name 311 of "CRAFT" to login to different programs 121 at the same or different customer sites.

The challenge 312 is field populated by the product 121 in step 370A when the user selects the get challenge button 320. The challenge 312 may be any identifier that is associated with a product 121. In one embodiment, the challenge 312 is a string that consists of a product certificate identifier (i.e., a product identifier 310 or part of a product identifier 310) and a random number concatenated into a single string. The challenge 312 may be specific to a version of software or hardware. The challenge 312 may be unique to a type of hardware or software. The challenge 312 may be unique to a company. For example, the challenge 312 may comprise company identifier, a product identifier 310, and optionally a random number. Alternatively, the challenge 312 may be based on another unique identifier, such as, a Media Access Control (MAC) number, a hardware address, a software checksum, and/or the like. The challenge 312 may be based on any of the above or various combinations of the above in addition to other fields. In FIG. 3, the challenge 312 is eleven characters long. However, the challenge 312 is not restricted to a particular number of characters.

The challenge 312 may have an associated time (e.g., five minutes) that the challenge 312 will expire. If the user does not use the challenge 312 within the time period, the challenge 312 will expire and a new challenge 312 will have to be requested.

The get challenge button 320 is selected by the user in order to receive a challenge 312. If the login name 311 is valid, the product 121 will populate the challenge 312 when the get challenge button 320 is selected by the user. When the user selects the get challenge button 320, the product login window 300A is changed to the product login window 300B in step 370B (except that the response to the challenge 341 is initially empty). The product login window 300B comprises the product identifier 310, the login name 311, the challenge 312, the response to the challenge 341, a login button 360, and the close button 321. The close button 321 allows the user to close the product login window 300A. The user can select the close button 321 at any time to exit the login process.

The central control login window 330 comprises the product identifier 310, the login name 311, a user identifier 340, the challenge 312, the response to the challenge 341, a get response button 350, and a close button 351. The user brings up the central control window 330 to login to the central control system 131. The user identifier 340 is a field that the user enters to uniquely identify the user.

The user may bring up the central control login window 330 before or after bringing up the product login window 300A. The user will typically establish the login process with the central control system 131 by establishing a Virtual Private Network (VPN) or using some other encrypted means to the central control system 131 from the communication endpoint 101. The user enters or select the product identifier 310, enters the login name 311, and enters the user identifier 340.

After receiving the challenge 312 in the product login window 300B, the user will typically copy/cut-and-paste or type the challenge 312 from the product login window 300B to the challenge 312 in the central control login window 330 in step 371 (e.g., via a user interface on the communication endpoint 101). The user then selects the get response button 350. If the product identifier, login name 311, and the user identifier 340 are valid, the response to the challenge 341 is generated and display in the central control window 330 in step 372. The response to the challenge 341 is typically longer than the challenge 312. For example, the challenge 312 may be 10 characters and the response to the challenge 341 may be 512 characters.

The response to the challenge 341 is calculated by the central control system 131. In one embodiment, the response to the challenge 341 is calculated as follows. The central control system 131 concatenates the challenge string (e.g., XXX06645454), the login name 311 (e.g., CRAFT), and an identifier of the central control system 131 (e.g. "a06c7df580804815920528519b0d5c8c01") into a services string. The services string is then hashed using a 256-bit Secure Hash Algorithm (SHA) using the private key 132 associated with the product 121. The hashed services string is then either signed or encrypted using the certificate private key. The result is then encoded using a Base58 encoding scheme.

The above example is one of many ways that the response to the challenge 341 may be generated. For example, the order of the elements in the concatenated services string may be different. Additional, different, and/or less fields may be used in the process of generating the response to the challenge 341. A different hashing algorithm may be used, such as, MD4, MD5, MD6, SHA-384, SHA-513, SHA-3, HAVAL, BLAKE-256, and/or the like. Alternatively, the response to the challenge 341 may be calculated only based on the challenge 312 (e.g., a hash of the challenge 312). The response to the challenge 341 may use other fields, such as an organization who issued the product 121, an organization who maintains the product 121, the product identifier 310, and/or the like. For example, a technician for company A may manage products 121 for companies B and C. This way, when the technician from company A logins in to manage products 121 from companies B and C, the information of the technician from company A managing the products 121 from companies B and C can be tracked.

The response to the challenge 341 in the central control login window 330 is then typically copied/cut-and-pasted or typed into the response to the challenge 341 in the product login window 300B in step 373. The user then selects the login button 360 in step 374. The product 121 the validates the response to the challenge 341 using the public key 122 to extract the challenge 312 from the response to the challenge 341. Based on the response extracted challenge 312 matching the challenge 312, the product 121 can extract the login name 311 (CRAFT) and compare the login name 311 entered in the product login window 300A (CRAFT) to see if the two login names 311 match. If the two login names 311 do not match or the extracted challenge 312 does not match the challenge 312, the login is denied. If the extracted challenge 312 matches the challenge 312 and the two login names 311 match, the login is granted. If the login is granted, the product 121 displays the product administration window 380 to the user. The user can then administer the product 121.

In addition, other criteria may be used for the login process. For example, the product 121 may also validate that the public key 122 (e.g., a certificate) has not expired. If the public key 122 has expired, the login process will not be granted.

The product 121, saves the login name 311 in a login database for the product 121. In addition, the user identifier 340 (JSMITH) is extracted from the response to the challenge 341 for storage in a login database for the product 121.

The above process of using the private key 132/public key 122 key pair can be implemented for different users. For example, a different user with a user identifier 340 of JDOE can login using the same private key 132/public key 122 pair to login to the same product 121.

The private key 132/public key 122 key pair may be specific to a product 121 (e.g., a hardware or software product 121), a version of a product (e.g., a hardware or software version of a product 121), a group of products 121, a specific company, a group of products within a company, and/or the like. For example, version 1.0 of product X may have a first private key 132/public key 122 key pair and version 2.0 of the product X may have a second private key 132/public key 122 key pair.

Figure 4:
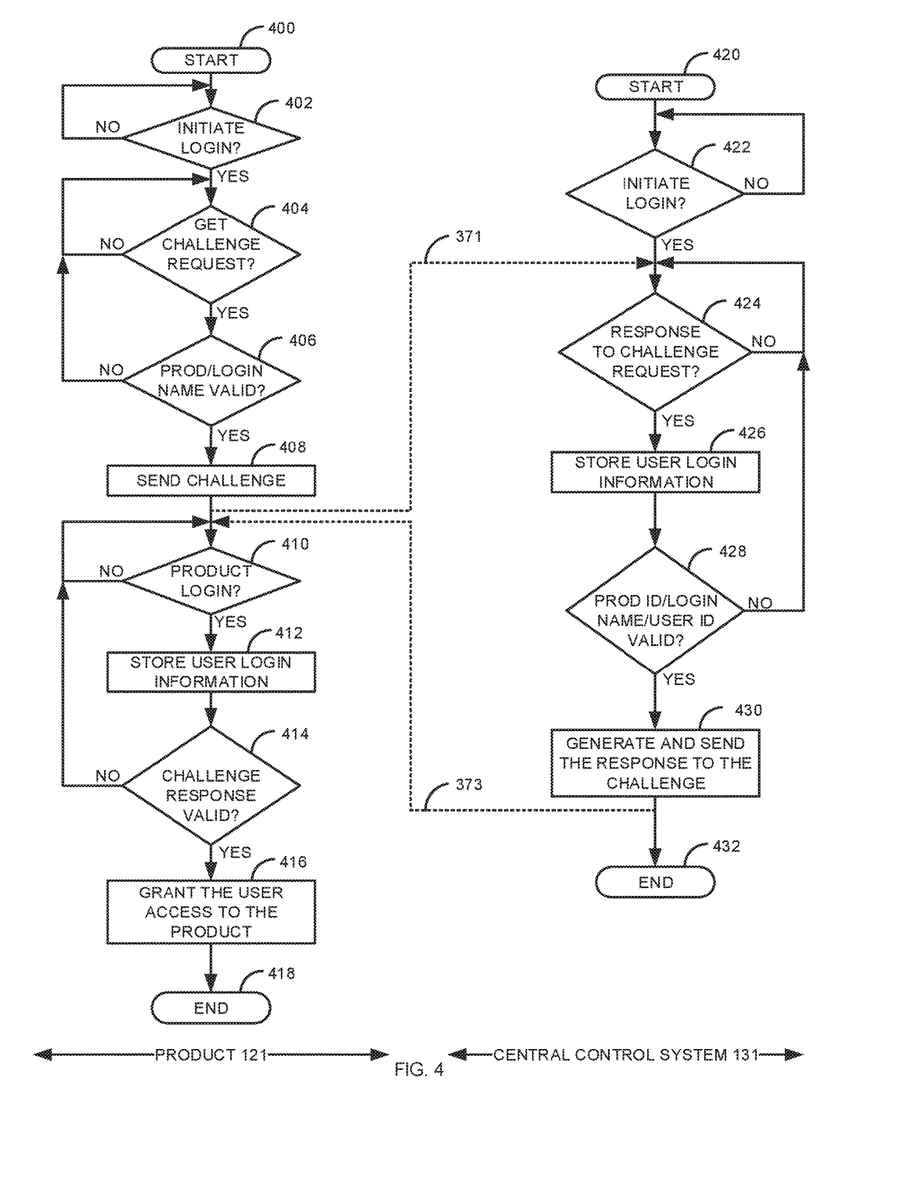
FIG. 4 is a flow diagram of a process for managing a secure login to a product.
Figure 5:
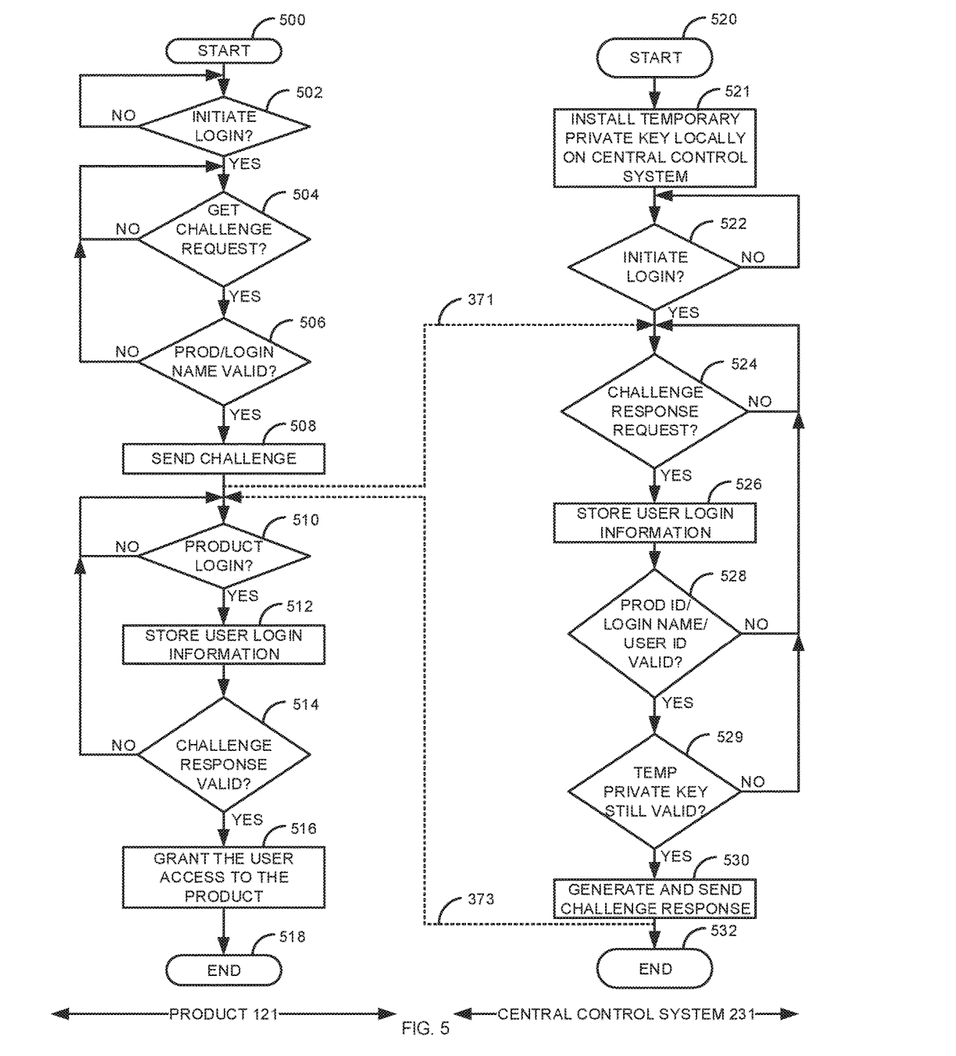
FIG. 5 is a flow diagram of a process for managing a secure login to a product on an isolated network.

FIG. 4 is a flow diagram of a process for managing a secure login to a product 121. Illustratively, the communication endpoint 101, the communication devices 120A-120N, the networks 110A-110B, 210, and 111, the products 121A-121N, the firewalls 123A-123B, the certificate authority 130, and the central control systems 131/231 are stored-program-controlled entities, such as a computer or microprocessor, which performs the method of FIGS. 4-5 and the processes described herein by executing program instructions stored in a computer readable storage medium, such as a memory or disk. Although the methods described in FIGS. 4-5 are shown in a specific order, one of skill in the art would recognize that the steps in FIGS. 4-5 may be implemented in different orders and/or be implemented in a multi-threaded environment. Moreover, various steps may be omitted or added based on implementation.

The process starts in steps 400 and 420. The user initiates the product login window 300A in step 402 from the communication endpoint 101. The user can initiate the login process in various ways. For example, the user may use a browser in the communication endpoint 101 to access the product login window 300A by typing in a Uniform Resource Locator (URL) to initiate the login process in step 402. Alternatively, the communication endpoint 101 may have an installed application that can be used to display the product login window 300A. If the user does not initiate the login process in step 402, the process waits in step 402 for the login process to be initiated.

If the user has initiated the login process in step 402, the product login window 300A is displayed to the user. The user enters or selects the product identifier 310 and enters the login name 311. The product 121 determines if the user has requested to get the challenge 312 in step 404. For example, the user has selected the get challenge button 320. If the user has not made a request to get the challenge 312 in step 404, the process waits for a request to get the challenge 312. If the user has requested to get the challenge 312 in step 404, the product 121 determines, in step 406 if the product identifier 310 and the login name 311 are valid. For example, the user entered an invalid product identifier 310 that is not recognized by the product 121. The login name 311 may be determined to be valid based on various factors, such as based on a list of login names 311. If the product identifier 310 and/or the login name 311 are not valid in step 406, the process goes back to step 404. Otherwise, if the product identifier 310 and the login name 311 are valid in step 404, the product 121 sends the challenge 312 in step 408 to be displayed to the user in the product login window 300B.

In the mean time, the user has initiated a login from the communication endpoint 101 to the central control system 131 in step 422. As a result, the central control login window 330 is displayed to the user at the communication endpoint 101. The login to the central control system 131 may be initiated in various ways, such as based on a URL typed in a browser in the communication endpoint 101, based on an application installed on the communication endpoint 101, and/or the like. After the central control login window 330 is displayed, the user enters/selects the product identifier 310, enters the login name 311, and enters the user identifier 340 in the central control login window 330. The user cuts-and-pastes (or enters) the challenge 312 from the product login window 300B in step 371 into the central control login window 330.

The central control system 131 then waits for the user to request a response to the challenge 341 in step 424. For example, the user clicks on the get response button 350. If the user does not request a response to the challenge 341 in step 424, the central control system 131 continues to wait in step 424. Otherwise, if the user has requested a response to the challenge 341 in step 424, the central control system 131 stores the user login information in step 426. For example, the system can store the product identifier 310, the login name 311, the user identifier 340, and/or the challenge 312 in step 426. By recording the user login information in step 426, the system can track both valid and invalid login requests.

The central control system 131 determines in step 428 if the product identifier 310, the login name 311, and the user identifier 340 are valid. For example, if the product identifier 310 is not for an existing product 121, if the login name 311 is not a known login name 311, and/or the user identifier 340 is not a known user identifier 340. The central control system 131 can also verify that the challenge 312 is the correct size. If the product identifier 310, the login name 311, and/or the user identifier 340 is invalid, the process goes back to step 424. For example, a pop-up window may be displayed stating that the user identifier 340 is unknown or invalid.

Otherwise, if the product identifier 310, the login name 311, and the user identifier 340 are valid in step 428, the central control system 131 generates and sends the response to the challenge 341 in step 430. The response to the challenge 341 is displayed to the user in the central control window 330. The user cuts/copies-and-pastes (or types) the response to the challenge 341 in the central login window 330 into the response to the challenge 341 in the product login window 300B. The process for the central control window 330 ends in step 432. For example, the user can select the close button 351.

After the user has copied/cut-and-pasted (or typed) the response to the challenged 341 from central control login window 330 to the product login window 300B, the product 121 is waiting for the user to login to the product 121 in step 410. For example, by the use selecting the login button 360. If the user has not tried to login to the product 121 in step 410, the product 121 continues to wait for a login in step 410.

Otherwise, if the user has requested to login in step 410, the product 121 stores the login information in step 412. The stored login information can be the product identifier 310, the login name 311, the challenge 312, and/or the response to the challenge 341 (that comprises the user identifier 340). This way the product 121 has a record of the specific user who is requesting to login to the product 121.

The product 121 determines if the response to the challenge 341 is valid based on the public key 122 in step 414. For example, as discussed above in FIG. 3. If the response to the challenge 341 is not valid in step 414, the process goes back to step 410 (or optionally back to step 402 to make the user repeat the process). Otherwise, if the response to the challenge 341 is valid in step 414, the product 121 grants the user access to the product 121 in step 416. For example, so that the user can administer or debug problems with the product 121. The product login process then ends in step 418.

FIG. 5 is a flow diagram of a process for managing a secure login to a product 121 on an isolated network 210. The process of FIG. 5 is based on the system described in FIG. 2.

The process starts in steps 500 and 520. The user initiates the product login window 300A in step 502 from the communication endpoint 101. The user can initiate the login process in various ways. For example, the user may use a browser in the communication endpoint 101 to access the product login window 300A by typing in a Uniform Resource Locator (URL) to initiate the login process in step 502. Alternatively, the communication endpoint 101 may have an installed application that can be used to display the product login window 300A. If the user does not initiate the login process in step 502, the process waits in step 502 for the login process to be initiated.

If the user has initiated the login process in step 502, the product login window 300A is displayed to the user. The user enters or selects the product identifier 310 and enters the login name 311. The product 121 determines if the user has requested to get the challenge 312. For example, the user has selected the get challenge button 320. If the user has not made a request to get the challenge 312 in step 504, the product 121 waits for a request to get the challenge 312. If the user has requested to get the challenge 312 in step 504, the product 121 determines, in step 506 if the product identifier 310 and the login name 311 are valid. For example, the user entered an invalid product identifier 310 or login name 311 that is not recognized by the product 121. The login name 311 may be determined to be valid based on various factors, such as based on a list of login names 311. If the product identifier 310 and/or the login name 311 are not valid in step 506, the process goes back to step 504. Otherwise, if the product identifier 310 and the login name 311 are valid in step 504, the product 121 sends the challenge 312 in step 508 to be displayed to the user in the product login window 300B.

An administrator has installed a temporary private key 232 locally on the central control system 231 in step 521. For example, the administrator can install the temporary private key 232 via a user interface from a USB memory card. A temporary private key 232 is a key that expires for a time period. For example, the time period may be 12 hours after the temporary key is installed on the central control system 231.

The user also initiated a login from the communication endpoint 101 to the central control system 231 in step 522. As a result, the central control login window 330 is displayed to the user at the communication endpoint 101. The login to the central control system 231 may be initiated in various ways, such as based on a URL typed in a browser in the communication endpoint 101, based on an application installed on the communication endpoint 101, and/or the like. After the central control login window 330 is displayed, the user enters/selects the product identifier 310, enters the login name 311, and enters the user identifier 340 in the central control login window 330. The user cuts-and-pastes (or enters) the challenge 312 from the product login window 300B in step 371 into the central control login window 330.

The central control system 231 then waits for the user to request a response to the challenge 341 in step 524. For example, the user clicks on the get response button 350. If the user does not request a response to the challenge 341 in step 524, the central control system 231 continues to wait in step 524. Otherwise, if the user has requested a response to the challenge 341 in step 524, the central control system 231 stores the user login information in step 526. For example, the central control system 231 can store the product identifier 310, the login name 311, the user identifier 340, and/or the challenge 312 in step 526. By recording the user login information in step 526, the central control system 321 can track both valid and invalid login requests.

The central control system 231 determines in step 528 if the product identifier 310, the login name 311, and the user identifier 340 are valid. For example, if the product identifier 310 is not for an existing product 121, if the login name 311 is not a known login name 311, and/or the user identifier 340 is not a known user identifier 340. If the product identifier 310, the login name 311, and/or the user identifier 340 is invalid, the process goes back to step 524. For example, a pop-up window may be displayed stating that the user identifier 340 is unknown or invalid.

Otherwise, if the product identifier 310, the login name 311, and the user identifier 340 are valid in step 528, the central control system 231 determines, in step 529, if the temporary private key 232 is still valid. If the temporary private key 232 is not valid in step 529, the process goes to step 524 (or alternatively ends). If the temporary private key 232 is valid in step 529, the central control system 231 generates and sends the response to the challenge 341 in step 530. The response to the challenge 341 is displayed to the user in the central control window 330. The user cuts/copies-and-pastes (or types) the response to the challenge 341 in the central login window 330 into the response to the challenge 341 in the product login window 300B. The process for the central control window 330 ends in step 532. For example, the user can select the close button 351.

After the user has copied/cut-and-pasted (or typed) the response to the challenged 341 from central control login window 330 to the product login window 300B, the product 121 is waiting for the user to login to the product 121 in step 510. For example, by the use selecting the login button 360. If the user has not tried to login to the product 121 in step 510, the product 121 continues to wait for a login in step 510.

Otherwise, if the user has requested to login in step 510, the product 121 stores the login information in step 512. The stored login information can be the product identifier 310, the login name 311, the challenge 312, and/or the response to the challenge 341 (that comprises the user identifier 340). This way the product 121 has a record of the specific user who is requesting to login to the product 121.

The product 121 determines if the response to the challenge 341 is valid based on the public key 122 in step 514. For example, as discussed above in FIG. 3. If the response to the challenge 341 is not valid in step 514, the process goes back to step 510 (or optionally back to step 502 to make the user repeat the process). Otherwise, if the response to the challenge 341 is valid in step 514, the product 121 grants the user access to the product 121 in step 516. For example, so that the user can administer or debug problems with the product 121. The product login process then ends in step 518.

In one embodiment, an administrator can remove the temporary private key 232 to deny access to the first user. When the request to get the response to the challenge 341 is received, if there is not temporary private key 232 for the product 121, the system will deny the request to get the response to the challenge 341.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that program the microprocessor to execute a central control system that:
receives a first login request of a first user, wherein the first login request comprises a login name, a user identifier, and a challenge received as part of a second login request to a first product;
determines if the login name and the user identifier are valid;
generates a response to the challenge in response to the login name and the user identifier being valid, wherein the response to the challenge is generated using a first private key, and wherein the first private key is specific to a first version of the first product;
sends the response to the challenge, wherein the response to the challenge is used as part of the second login request by the first user and wherein the first product verifies the response to the challenge using a first public key to allow the first user access to the first product, and wherein the first public key is specific to the first version of the first product; and
enables the first user to access a second version of the first product using a second private key and a second public key.

2. The system of claim 1, wherein the challenge is based on a serial number of the first product and a random number.

3. The system of claim 1, wherein the first product records the first login request based a login name extracted from the response to the challenge using the first public key and a user identifier in the response to the challenge.

4. The system of claim 1, wherein the generated response to the challenge is generated using a hash of the challenge.

5. The system of claim 4, wherein the generated response to the challenge is further generated based on one of: an organization who issued the first product, an organization who maintains the first product, or a serial number of the first product.

6. The system of claim 4, wherein the generated response to the challenge is further generated based on the user identifier.

7. The system of claim 1, wherein the first private key and the first public key are used for a second user login with a second user to the first product.

8. The system of claim 1, wherein the first and second login requests also comprises a product identifier.

9. The system of claim 1, wherein the first private key and the first public key are associated with the first product and wherein a second private key and a second public key are associated with a second product.

10. A method comprising:
- receiving, by a microprocessor, a first login request of a first user, wherein the first login request comprises a login name, a user identifier, and a challenge received as part of a second login request to a first product;
- determining, by the microprocessor, if the login name and the user identifier are valid;
- in response to the login name and the user identifier being valid, generating, by the microprocessor, a response to the challenge, wherein the response to the challenge is generated using a first private key, and wherein the first private key is specific to a first version of the first product;
- sending, by the microprocessor, the response to the challenge, wherein the response to the challenge is used as part of the second login request by the first user and wherein the first product verifies the response to the challenge using a first public key to allow the first user access to the first product, and wherein the first public key is specific to the first version of the first product; and
- enabling the first user to access a second version of the first product using a second private key and a second public key.

11. The method of claim 10, wherein the challenge is based on a serial number of the first product and a random number.

12. The method of claim 10, wherein the first product records the first login request based a login name extracted from the response to the challenge using the first public key and a user identifier in the response to the challenge.

13. The method of claim 10, wherein the generated response to the challenge is generated using a hash of the challenge.

14. The method of claim 13, wherein the generated response to the challenge is further generated based on the user identifier.

15. The method of claim 10, wherein the first private key and the first public key are used for a second user login with a second user to the first product.

16. A system comprising:
- a microprocessor; and
- a computer readable medium, coupled with the microprocessor and comprising microprocessor readable and executable instructions that program the microprocessor to execute a central control system that:
- receives a first login request of a first user, wherein the first login request comprises a login name, a user identifier, and a challenge received as part of a second login request to a first product, wherein the central control system is on an isolated network;
- determines if the login name and user identifier are valid;
- generates a response to the challenge in response to the login name and the user identifier being valid, wherein the response to the challenge is generated using a temporary first private key, wherein the temporary first private key is installed locally on the central control system, and wherein the temporary first private key is specific to a first version of the first product;
- sends the response to the challenge, wherein the response to the challenge is used as part the second login request and wherein the first product verifies the response to the challenge using a first public key associated with the temporary first private key to allow the first user access to the first product, and wherein the first public key is specific to the first version of the first product; and
- enables the first user to access a second version of the first product using a temporary second private key and a second public key.

17. The system of claim 16, wherein the temporary first private key automatically expires after a defined time period.

18. The system of claim 16, wherein removal of the temporary first private key denies access to the first user.

* * * * *